United States Patent Office 3,015,677
Patented Jan. 2, 1962

3,015,677
PROCESS FOR THE STABILIZATION OF CHLOROPRENE
Wilhelm Vogt, Knapsack, near Koln, Hans Weiden, Koln-Nippes, Klaus Gehrmann, Bonn, and Kurt Sennewald, Knapsack, near Koln, Germany, assignors to Knapsack-Griesheim Aktiengesellschaft, Knapsack, near Koln, Germany, a corporation of Germany
No Drawing. Filed Jan. 20, 1960, Ser. No. 3,515
Claims priority, application Germany Jan. 31, 1959
6 Claims. (Cl. 260—652.5)

The present invention is concerned with a process for the stabilization of chloroprene, especially against ω-polymerization.

It is known that from monomeric chloroprene there are preferably formed two structurally different types of polymers. The first one is the α-polymer that is in most cases completely soluble in monomeric chloroprene and is appreciated for its elastomeric properties, whereas the second type is the ω-polymer growing in crumbly masses, whose formation complicates the preparation of monomeric chloroprene by obstructing the plant.

Both polymer types are obviously formed according to different reaction mechanisms. The polymerization inhibitors are likewise different. Whereas the α-polymerization is easily prevented by numerous known inhibitors, mostly redox systems such as hydroquinone, substituted hydroquinones, phenothiazine, phenyl-β-naphthylamine and others, not many substances have become known for inhibiting the ω-polymerization. As effective stabilizers there may be mentioned above all nitric oxide and nitrogen dioxide. However, both substances form oily, explosive compounds with chloroprene so that a stabilization carried out therewith—particularly on a larger scale—is dangerous. In addition, $NO_2$ and chloroprene react with each other so violently that explosions in the gas phase can only be prevented by taking special precautionary measures. In the presence of monovinyl acetylene, the primary product of chloroprene, the danger of explosion is even very much increased. Monovinyl-acetylene, for example, yields with NO a reaction product being instable at room temperature, whose decomposition leads to spontaneous explosion.

Now it has been found that the ω-polymerization of chloroprene is safely inhibited by means of organic substances containing nitrogen and oxygen, such as the product obtained by the reaction of 1,2-dichlorethylene with $NO_2$, or by means of N-nitroso-diphenylamine.

The concentration of stabilizer required for completely inhibiting the growth of the seed of the ω-polymer depends on the temperature and can be the lower the higher is the temperature (see examples and tables).

The present invention is thus concerned with a process for the stabilization of chloroprene, especially against ω-polymerization, wherein there is added to the chloroprene as stabilizer inhibiting the polymerization N-nitroso-diphenylamine or 1,2-dichlor-1-nitroethylene or dimeric monochloro nitroethylene or mixtures of these compounds. The reaction product obtained, for example, according to the process for the preparation of nitro compounds of ethylenes substituted by chlorine by reaction of 1,2-dichlorethylene with $NO_2$ (Patent 1,103,917, German patent application K 36 738 IVb/12 o filed January 16, 1959), can be used as stabilizer.

According to a further feature of the process of the invention, the stabilizers are used in a dissolved state, chloroprene itself preferably serving as solvent. There may, for example, be added to the chloroprene to be stabilized the nitro compounds of the mono- and dichlorethylene in the form of solutions of about 10% strength in chloroprene.

The mentioned stabilizers can also advantageously be applied in combination with stabilizers inhibiting the α-polymerization, for example together with phenothiazine or with derivatives of pyrocatechol.

Supplementary to the above, there is stated the following:

The reaction product from 1,2-dichlorethylene and $NO_2$ stabilizes boiling chloroprene even against the growth of the imbedded seed of the ω-polymer if it is applied in a concentration of more than about 0.2%. The limit of 0.2% is required for inhibiting the growth of imbedded, that is to say of several and large germs. If no germs are added a lower concentration already suffices for the stabilization for very long periods. If freshly grown and active germs of the ω-polymer are present, their growth is interrupted. Since the quantity of the reaction product from dichlorethylene and $NO_2$ applied for stabilization is relatively small, it is advisable to dose the stabilizer in the form of its solution in chloroprene, for example of a solution of 10% strength.

The same stabilizing effect is produced by N-nitroso-diphenylamine that can easily be prepared from diphenylamine in methanolic solution with simultaneous addition of an aqueous sodium nitrite solution and aqueous hydrochloric acid. The concentration in chloroprene required for the complete and absolutely safe inhibition of the growth of the ω-polymer amounts at the boiling point to about 0.2%, even when active germs are present. It is advisable to dose this stabilizer likewise in the form of a chloroprene solution.

It is also possible to use the N-nitroso-diphenylamine in admixture with the reaction product from dichlorethylene and $NO_2$. Both stabilizers likewise act in the same manner if the chloroprene to be stabilized contains monovinyl-acetylene.

Tests showed that the reaction product from 1,2-dichlorethylene and from $NO_2$ is not in a position to prevent the α-polymerization in a satisfactory manner. Therefore, it is necessary for the inhibition of the α-polymerization to add to the chloroprene to be stabilized, apart from this stabilizer, another of the known inhibitors such as phenothiazine or a derivative of pyrocatechol. In the case of phenothiazine an addition of 0.01 to 0.1% is sufficient.

In contradistinction thereto, N-nitroso-diphenylamine applied per se, that is to say without addition of a second inhibitor, acts simultaneously as a relatively good stabilizer against the α-polymerization. However, in this case it is also possible to improve the stabilizing effect against the α-polymerization by addition of a second inhibitor of the usual kind.

The cyclic dimer of the chloroprene, that is produced upon heating beside the α- and ω-polymer with or without addition of substances inhibiting the ω-polymerization, is formed in approximately the same but small quantity.

Among the reaction products from 1,2-dichlorethylene and $NO_2$, the dimeric monochloro-nitroethylene shows the better stabilizing action. The action of 1,2-dichloro-1-nitroethylene mainly obtained by this reaction is a little weaker but the mixture from the two components (when prepared according to Patent 1,103,917 [German patent application K 36 738 IVb/12 o filed January 16, 1959], it contains 60 to 80% by weight of 1,2-dichloro- 1-nitroethylene) has good stabilizing properties so that it is of advantage to apply this reaction mixture in about such concentrations as are indicated in the following examples. Generally, there is used a solution of the reaction mixture in chloroprene and this solution is added in corresponding portions.

The following examples serve to illustrate the invention but they are not intended to limit it thereto; the parts being by weight:

Example 1

N-nitroso-diphenylamine is used as stabilizer. The stabilizing action of 0.1 to 1 part of N-nitroso-diphenylamine on germs of the ω-polymer imbedded in 1000 parts of chloroprene depends on the concentration and temperature. The following table shows the inhibition of the growth of the ω-polymer during a test time of 30 days.

| Percent (by weight) of N-nitroso-diphenylamine | 0.1 | 0.15 | 0.2 | 0.3 | 0.5 | 1.0 | Explanation of symbols |
|---|---|---|---|---|---|---|---|
| t., °C.: | | | | | | | |
| 20 | − | − | − | + | ++ | ++ | − No. |
| 45 | − | − | + | ++ | +++ | +++ | + bad. |
| 55 | − | + | ++ | +++ | +++ | +++ | ++ moderate. |
| 60 | + | ++ | +++ | +++ | +++ | +++ | +++ very good inhibition of the formation of the ω-polymer. |

The N-nitroso-diphenylamine applied was prepared as follows: 30 kg. of aqueous hydrochloric acid ($d_{20}=1.19$) and 35 kg. of sodium nitrite in 52 kg. of water are introduced, while stirring, into a solution consisting of 40 kg. of diphenylamine and 185 kg. of methanol in such a manner that there is always a small excess of hydrochloric acid and that a reaction temperature of 0–5° C. is maintained. The N-nitroso-diphenylamine formed is filtered off with suction, washed several times with 20 kg. each of water and dried in the air. The yield is almost quantitative. The yellowish product melts at +66° C.

Example 2

0.2 to 1 part of N-nitroso-diphenylamine in 1000 parts of chloroprene heated under reflux stabilize at +55 to +60° C. the vapor phase of a chloroprene distillation column against the formation of the α- and ω-polymer. The column is filled with glass rings, spirals from ceramics or from stainless steel V₄A. Even when exposed to light and when using substances coming into contact with oxygen, the stabilizing action lasts for 60 days. Germs grown in non-stabilized chloroprene and placed in the vapor phase turn brown and stop growing.

The following table illustrates this stabilizing effect:

| Parts of N-nitrosodiphenylamine in 1,000 parts of chloroprene, heated under reflux | Time of distillation (days) | Growth of the ω-germs | Explanation of symbols |
|---|---|---|---|
| 0.15 | 8 | + | |
| 0.20 | 30 | − | |
| 0.30 | 60 | − | + slow growth. |
| 0.50 | 60 | − | − no growth. |
| 1.0 | 60 | − | |

Example 3

The gaseous phase of boiling chloroprene diluted with 12 to 15% by weight of monovinyl-acetylene is stabilized, in a chloroprene distillation column by means of 0.2 to 1 part of N-nitroso-diphenylamine in 1000 parts of chloroprene being refluxed, for 60 days, even when exposed to light, in a satisfactory manner, against α- and ω-polymerization. This results from the following table:

| Parts of N-nitrosodiphenylamine in 1,000 parts of chloroprene, heated under reflux | Time of distillation (days) | Growth of the ω-germs | Explanation of symbols |
|---|---|---|---|
| 0.05 | 8 | ++ | ++ rapid growth. |
| 0.1 | 8 | + | + slow growth. |
| 0.2 | 16 | − | − no growth. |
| 0.3 | 60 | − | |
| 0.5 | 60 | − | |
| 1.0 | 60 | − | |

Example 4

The reaction product from 1,2-dichloroethylene and NO₂ is used as stabilizer. It consists of a mixture of 1,2-dichloro-1-nitroethylene and dimeric monochloronitroethylene. The dependence on the temperature of the stabilizing effect against the ω-polymerization to be inhibited is shown in the following table. In the tests one freshly grown active germ of the ω-polymer at a time was sprayed with chloroprene in a column filled with packing material; the chloroprene had a varying stabilizer content. The tests ran until the ω-polymerization set in, or at most for 30 days.

| Percent (weight) of phenothiazine | 0.01 | 0.02 | 0.03 | 0.04 | 0.05 | 0.06 | 0.07 | 0.08 | 0.09 | 0.1 | Explanation of symbols |
|---|---|---|---|---|---|---|---|---|---|---|---|
| Percent of reaction product from 1,2-dichlorethylene and NO₂ | 0.1 | 0.2 | 0.3 | 0.4 | 0.5 | 0.6 | 0.7 | 0.8 | 0.9 | 1.0 | |
| t., °C.: | | | | | | | | | | | Stabilized against ω-polymerization: |
| 60 | ++ | +++ | +++ | +++ | +++ | +++ | +++ | +++ | +++ | +++ | − not at all. |
| 55 | + | ++ | +++ | +++ | +++ | +++ | +++ | +++ | +++ | +++ | + bad. |
| 50 | + | ++ | ++ | +++ | +++ | +++ | +++ | +++ | +++ | +++ | ++ moderate. |
| 45 | − | + | ++ | ++ | +++ | +++ | +++ | +++ | +++ | +++ | +++ very well. |
| 40 | − | + | + | ++ | ++ | ++ | +++ | +++ | +++ | +++ | |
| 35 | − | − | + | + | ++ | ++ | ++ | ++ | +++ | +++ | |
| 30 | − | − | + | + | + | ++ | ++ | ++ | ++ | +++ | |
| 25 | − | − | − | + | + | + | + | ++ | ++ | ++ | |
| 20 | − | − | − | − | + | + | + | + | + | + | |

Example 5

A solution of 0.35 part of the reaction product from 1,2-dichloroethylene and nitrogen dioxide and of 0.05 to 0.3 part of phenothiazine in 1000 parts of chloroprene was introduced into the upper portion of a distilling column impurified with a freshly grown germ of the ω-polymer. The chloroprene was distilled under reflux. The germ of the ω-polymer already turned brown after a few hours. No growth was observed within a period of 28 days.

Example 6

The solution of the stabilizer in chloroprene already used in Example 5 was introduced into the flask of a distilling column and the chloroprene was distilled under reflux. The column was impurified with a germ of the ω-polymer whose growth was interrupted for 26 days.

Example 7

A germ of the ω-polymer, that had been treated for 5 hours at +60° C. in a solution of 0.1 part of the reaction product from 1,2-dichlorethylene and nitrogen dioxide and of 0.1 part of phenothiazine in 100 parts of chloroprene, was then placed into chloroprene merely stabilized against the α-polymerization by means of 0.01% by weight of phenothiazine. At a temperature of +20° C. no growth of the germ of the α-polymer was observed even after 30 days.

Example 8

A solution of 0.35 part of the reaction product from 1,2-dichlorethylene and nitrogen dioxide, of 0.03 part of phenothiazine and of 150 parts of monovinyl-acetylene in 850 parts of chloroprene was tested at various temperatures, as described in Example 4, for its stabilizing action against the ω-polymerization of the chloroprene. The same dependence on the temperature resulted as indicated in Example 4.

We claim:

1. A process for the stabilization of chloroprene against ω-polymerization, which comprises adding to the chloroprene as polymerization inhibitor a substance selected from the group consisting of N-nitroso-diphenylamine, dichloro-1-nitro-ethylene, dimeric monochloronitroethylene and a mixture of dichloro-1-nitroethylene and dimeric monochloronitroethylene, in an amount of at least 0.2 part per thousand parts of chloroprene.

2. A process as claimed in claim 1, which comprises applying the stabilizers in a dissolved state.

3. A process as claimed in claim 2, which comprises using chloroprene as solvent.

4. A process as claimed in claim 2, which comprises adding to chloroprene the nitro compounds of the mono- and dichloroethylene in the form of solutions of about 10% strength in chloroprene.

5. A process as claimed in claim 1, which comprises applying the said stabilizers in combination with stabilizers inhibiting the α-polymerization.

6. A process as claimed in claim 5, which comprises applying the said stabilizers in combination with the stabilizers inhibiting the α-polymerization consisting of at least one substance selected from the group consisting of phenothiazine and derivatives of pyrocatechol.

References Cited in the file of this patent

UNITED STATES PATENTS

| | | |
|---|---|---|
| 2,121,012 | Britton et al. | June 21, 1938 |
| 2,181,102 | Stoesser et al. | Nov. 21, 1939 |

FOREIGN PATENTS

| | | |
|---|---|---|
| 765,522 | Great Britain | Jan. 9, 1957 |

UNITED STATES PATENT OFFICE

CERTIFICATE OF CORRECTION

Patent No. 3,015,677 January 2, 1962

Wilhelm Vogt et al.

It is hereby certified that error appears in the above numbered patent requiring correction and that the said Letters Patent should read as corrected below.

Column 2, lines 14, 15, 32 and 47, for "%" read -- ‰ --; columns 3 and 4, in the tables under Examples 1 and 4, in the heading to the first column, for "Percent", each occurrence, read -- ‰ --.

Signed and sealed this 15th day of May 1962.

(SEAL)
Attest:

ERNEST W. SWIDER
Attesting Officer

DAVID L. LADD
Commissioner of Patents